(12) United States Patent
Stevenot

(10) Patent No.: US 12,183,140 B2
(45) Date of Patent: *Dec. 31, 2024

(54) LOTTE LOCKBOX AND PARCEL MANAGEMENT SYSTEM

(71) Applicant: Milotte, Waycross, GA (US)

(72) Inventor: James Stevenot, Waycross, GA (US)

(73) Assignee: Milotte, Waycross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,833

(22) Filed: Jun. 27, 2023

(65) Prior Publication Data
US 2023/0334925 A1 Oct. 19, 2023

Related U.S. Application Data

(63) Continuation of application No. 17/657,271, filed on Mar. 30, 2022, now Pat. No. 11,699,314, which is a continuation of application No. 16/826,247, filed on Mar. 22, 2020, now Pat. No. 11,302,126.

(60) Provisional application No. 62/943,859, filed on Dec. 5, 2019.

(51) Int. Cl.
G07C 9/00 (2020.01)
A47G 29/14 (2006.01)

(52) U.S. Cl.
CPC ....... *G07C 9/00817* (2013.01); *A47G 29/141* (2013.01); *A47G 2029/146* (2013.01); *A47G 2029/147* (2013.01); *A47G 2029/149* (2013.01); *G07C 9/00571* (2013.01); *G07C 2009/0092* (2013.01)

(58) Field of Classification Search
None
See application file for complete search history.

(56) References Cited

U.S. PATENT DOCUMENTS

| | | | |
|---|---|---|---|
| 6,756,879 B2 * | 6/2004 | Shuster | G07F 17/13 700/214 |
| 2010/0085148 A1 * | 4/2010 | Nesling | A47G 29/30 340/5.73 |

* cited by examiner

Primary Examiner — Adolf Dsouza
(74) Attorney, Agent, or Firm — Tatonetti IP

(57) ABSTRACT

A lockbox and parcel management system is implemented in which a lockbox having multiple compartments is controllable via an access device that locks and unlocks respective compartments upon receiving a proper access code input. A user may place an order with an e-commerce service using an e-commerce application or website. The e-commerce service, upon receiving the order, may transmit order information to a lockbox remote service which can communicate with a user device associated with the user who placed the order, the access device for the lockbox, and a deliverer's device from the delivery company. The lockbox remote service or authorized user/owner may set access codes for the deliverer to open and place a parcel in a lockbox's compartment for safe and secure storage until the user arrives home.

20 Claims, 14 Drawing Sheets

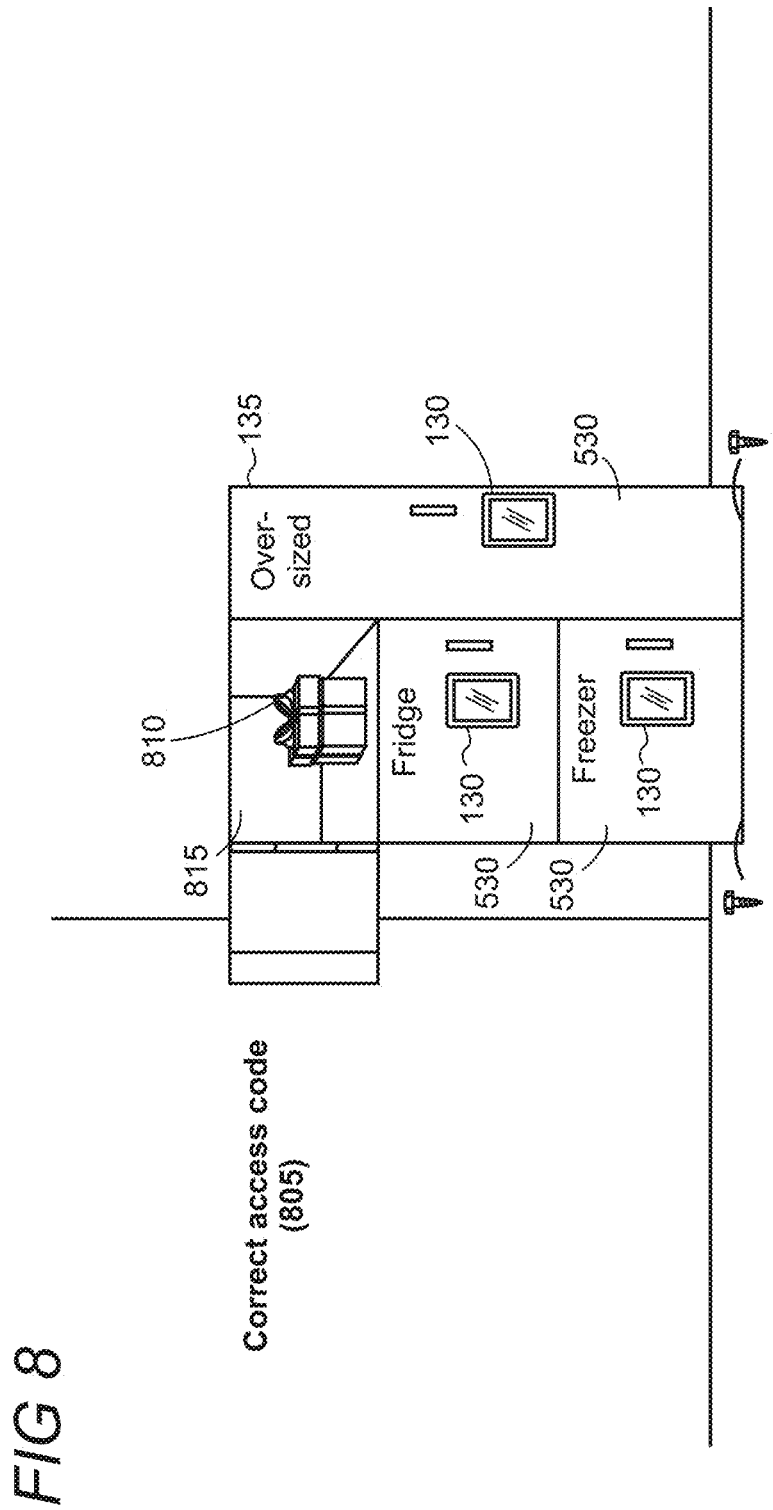

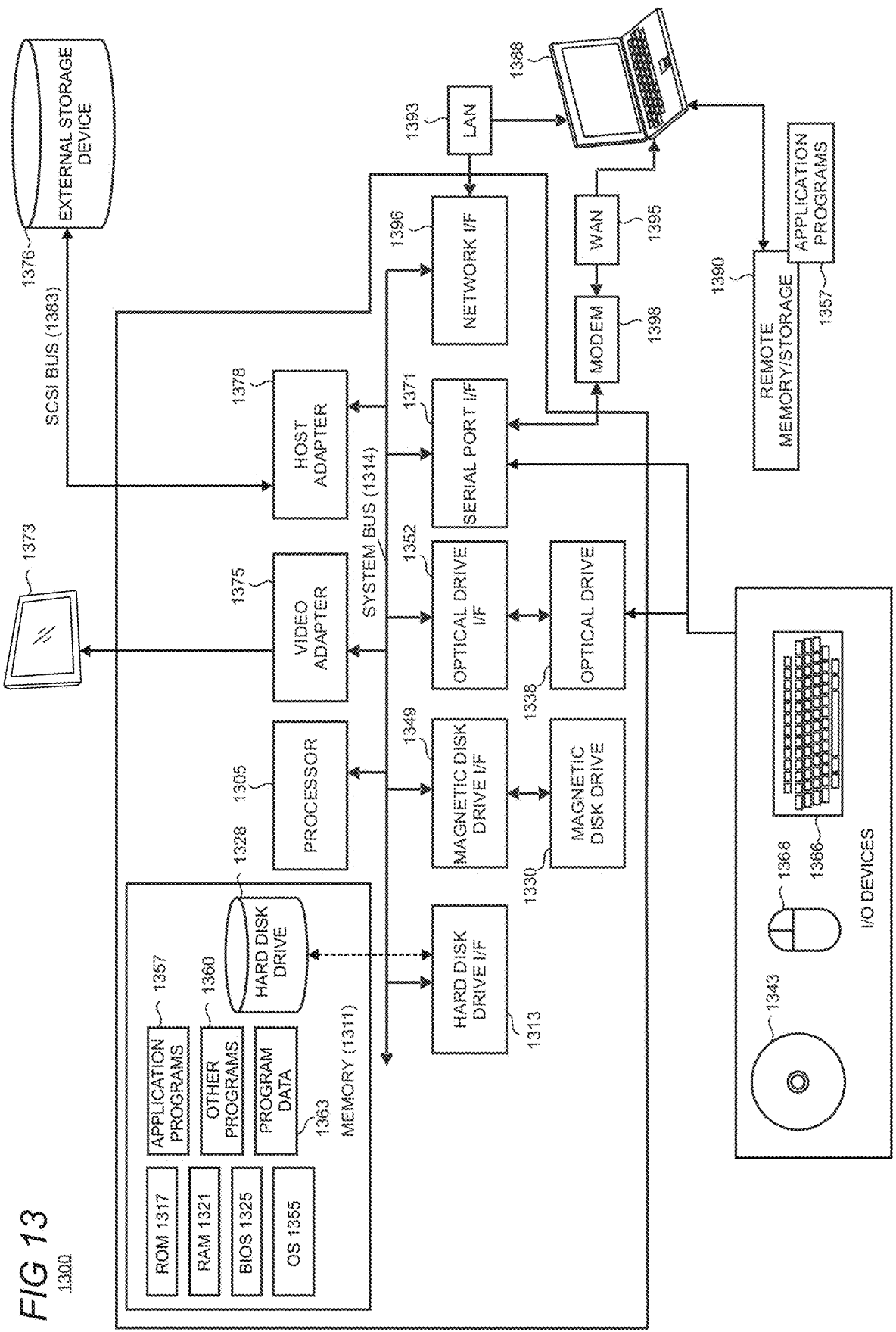

LOTTE LOCKBOX AND PARCEL MANAGEMENT SYSTEM

CROSS-REFERENCE TO RELATED APPLICATIONS

This Non-provisional Utility Patent Application is a Continuation Application that claims the benefit of and priority to U.S. patent application Ser. No. 17/657,271, filed Mar. 30, 2022, entitled "Lotte Lockbox and Parcel Management System," which claims the benefit of and priority to "U.S. patent application Ser. No. 16/826,247, filed Mar. 22, 2020, entitled "The Lotte Lockbox and Parcel Management System," which claims the benefit of and priority to U.S. Provisional Application Ser. No. 62/943,859, entitled "Lock Box," filed on Dec. 5, 2019, the entire contents of both applications of which are hereby incorporated herein by reference.

BACKGROUND

Due to the widespread adoption by consumers of e-commerce services, parcels are routinely left unattended at homes or places of business. Thieves have recognized this routine and steal packages from establishments which causes a burden on the entire industry including e-commerce businesses, delivery companies, and consumers.

SUMMARY

A lockbox and parcel management system is implemented in which a lockbox having multiple compartments is controllable via an access device that locks and unlocks respective compartments upon receiving a proper access code input. A user may place an order with an e-commerce service using an e-commerce application or website. The e-commerce service, upon receiving the order, may transmit order information to a lockbox remote service. The remote service can communicate with a user device associated with the user who placed the order, the access device for the lockbox, and a deliverer's device to control security over package drop-off.

The lockbox remote service may generate and transmit an access code to the access device, the user device, and the deliverer's device. In some implementations, the user may utilize a local lockbox application to select and create the access code for transmission to the deliverer and the access device. Depending on the scenario, the access code may be a one-time or continuous use code. The access code may be associated with particular individuals so that the user can identify all accesses to the lockbox compartments. Furthermore, in some implementations, each compartment on the lockbox may be associated with a unique access code, in which case the deliverer may receive multiple access codes with which he can input into the access device to unlock one or more desired compartments. For example, cooler items may be placed inside a refrigerated compartment, frozen items may be placed inside a freezer compartment, average-sized items may be placed in a dry compartment, and over-sized items may be placed inside an oversized compartment. The lockbox may be physically secured to a structure, such as the ground or a wall, to prevent movement or transport of the entire lockbox and its contents.

The access device may unlock multiple compartments on the lockbox or each compartment may be associated with a respective access device. The access device may have a network interface controller to connect to a local network and/or communicate with in-range devices, such as using Wi-Fi and Bluetooth™. The access device may communicate with other keyless entry systems at the user's home to enable a dynamic setup of the lockbox. For example, the access device may open a garage door that leads to the lockbox to provide a double layer of security to the user's parcels. The deliverer may input a single access code that controls the garage door and the lockbox's compartment, or may input individual codes for each.

The access device may activate security features responsive to receiving the access code at its input mechanism (e.g., touchscreen display, keypad, biometric scan, etc.). Security measures can include recording one or both of audio and video and live streaming the recording to the user's lockbox application or web browser for viewing. The lockbox application or remote service may maintain a log of all input attempts at the access device, whether approved or rejected.

The present lotte lockbox and parcel management system provides a physical and technical security system over delivered parcels to prevent thievery. Access codes can be utilized to control who can access the lockbox's compartments and provide a record of who accessed a given compartment and when. The one-time use restriction of an access code enables a deliverer to deliver the parcel but prevents him from re-using the code at a later time. Furthermore, the interoperation of the access device to other networked devices, such as keyless access devices and the user's device, even further enhances the access device's capabilities. The physical and technical security measures of the lockbox provide consumers with ease of mind when placing e-commerce orders.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DESCRIPTION OF THE DRAWINGS

FIG. 8 shows an illustrative environment in which a compartment on the lockbox opens responsive to a deliverer entering the correct access code;

FIG. 13 shows a simplified block diagram of a computing device which may be used to implement the preset lotte lockbox and parcel management system.

Like reference numerals indicate like elements in the drawings. Elements are not drawn to scale unless otherwise indicated.

DETAILED DESCRIPTION

Figure 1:
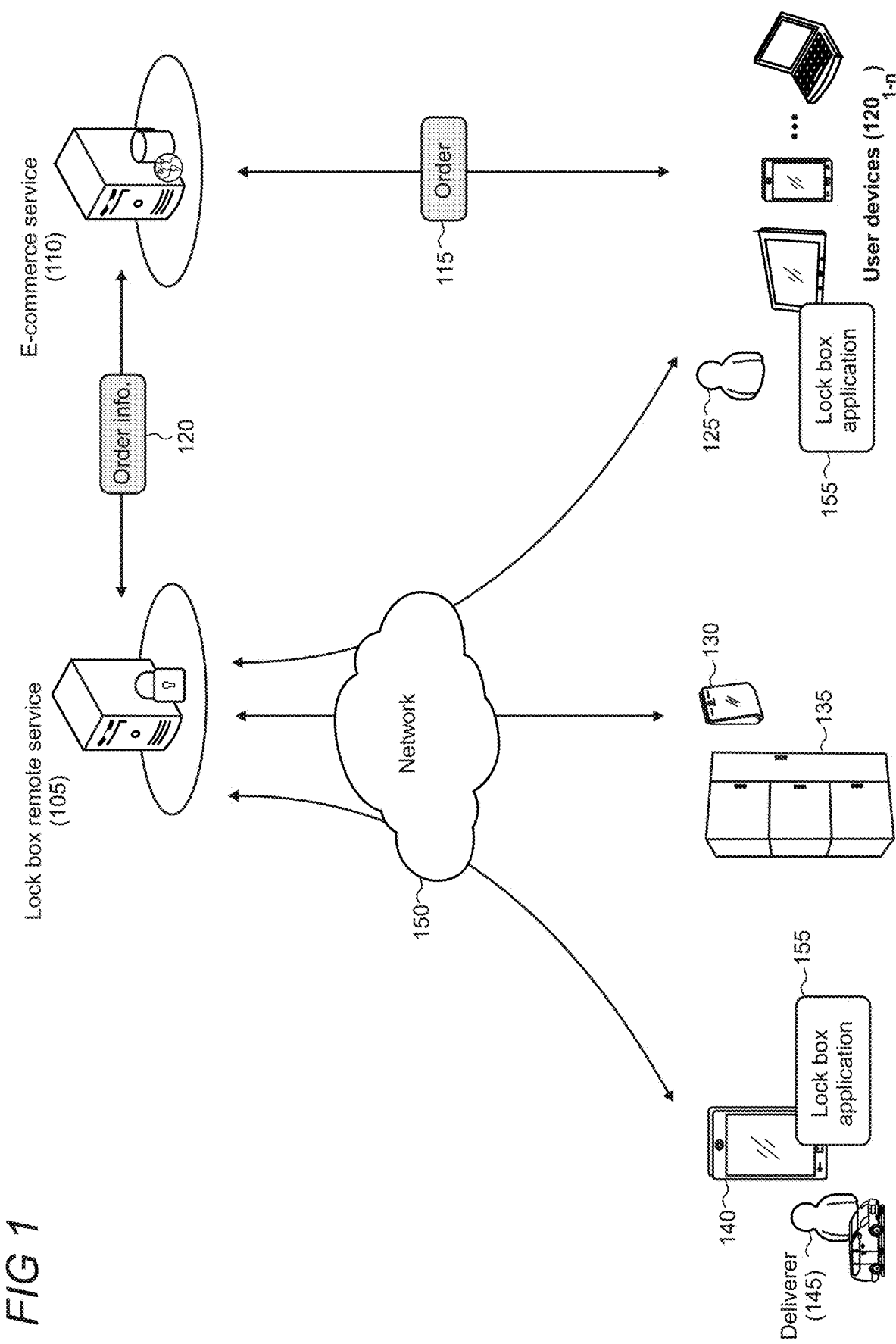
FIG. 1 shows an illustrative environment in which a lockbox remote service communicates with various end devices to enhance security over an e-commerce order and delivery.

FIG. 1 shows an illustrative environment in which a user 125 places an order 115 with an e-commerce service 110. The e-commerce service may be some store that sells any type of goods over the Internet, including clothing, cleaning supplies, food and perishables, etc. The purchase may be directly with a company providing the goods or can be marketplace through which third-parties can sell goods (e.g., Amazon® or eBay®). Upon placing the order with the user's computing device 120, the e-commerce service 110 may transmit the order information 120 to a lockbox remote service 105, aside from performing other actions such as transmit packaging and routing information to a delivery service.

Figure 2:
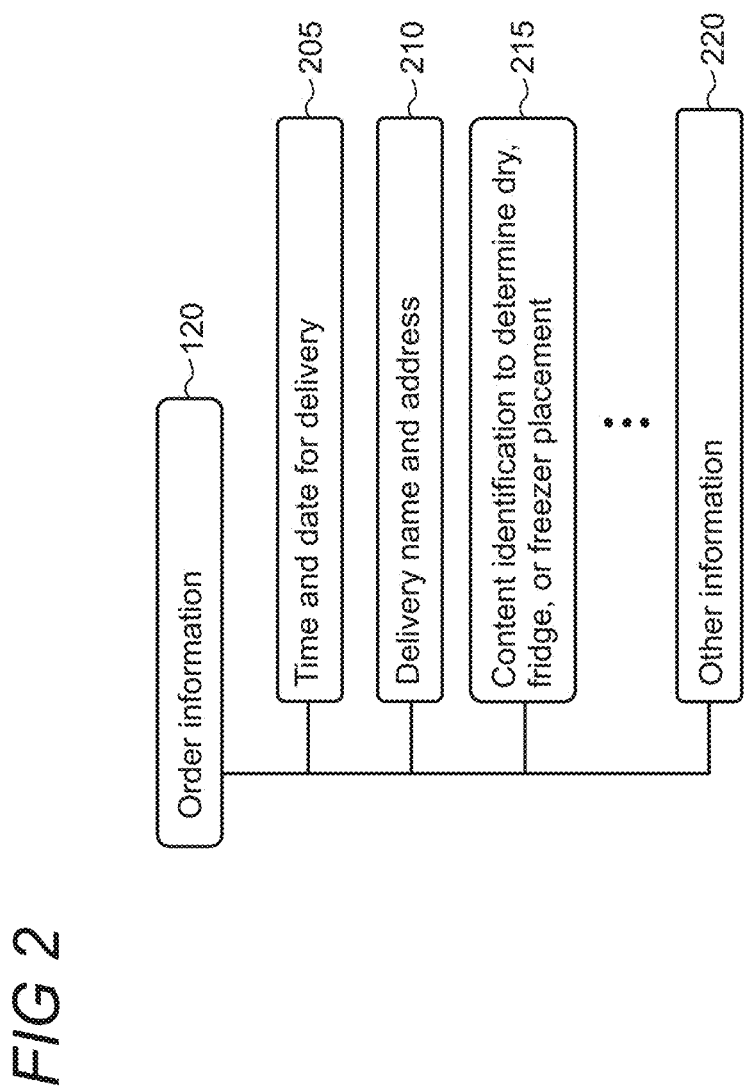
FIG. 2 shows an illustrative list of order information items transmitted to the lockbox remote service from an e-commerce service.

FIG. 2 shows an illustrative list of order information 120 which may be transmitted to the lockbox service 105 (FIG. 1). The information can include time and date for delivery 205, delivery name and address 210, content identification to determine dry, fridge, or freezer placement 215 (discussed in greater detail below), and other information 220. The lockbox service may interoperate with and receive information from multiple different e-commerce services when a user places an order. The lockbox service can operate with multiple different users, delivery providers, and e-commerce services. The implementation discussed herein provides an illustrative example for one particular order and delivery.

Referring back to FIG. 1, the various services and computing devices can communicate with each other over network 150, which can include a collection of any one or more of personal area networks, local area networks, wide area networks, the Internet, and the World Wide Web. Upon receiving the order information, the lockbox remote service 105 may correspond and communicate with one or more of the user devices 120, a deliverer 145 and his or her respective computing device 140, and an access device 130 associated with the lockbox 135 of the user/owner 125. A lockbox application 155 may be instantiated on the user's and deliverer's respective computing devices, which can receive information from the lockbox remote service. Alternatively, a web browser application can be utilized to access information from the lockbox remote service.

In typical implementations, the deliverer 145 may receive information from the lockbox remote service 105, such as access codes to access and drop off parcels at the lockbox 135. The user 125 may transmit to and receive information from the lockbox remote service. For example, the user can receive access codes generated by the lockbox remote service or the user can select and customize access code usage and transmit such customizations to the service. Likewise, the user can use the remote service to generate a randomized access code or select his own code and provide that code to a neighbor or friend for a safe one-time deliver. In that regard, users who seek to drop off items may not necessarily have their own lockbox application, but can still leverage the system by having a correct access code.

Figure 3:
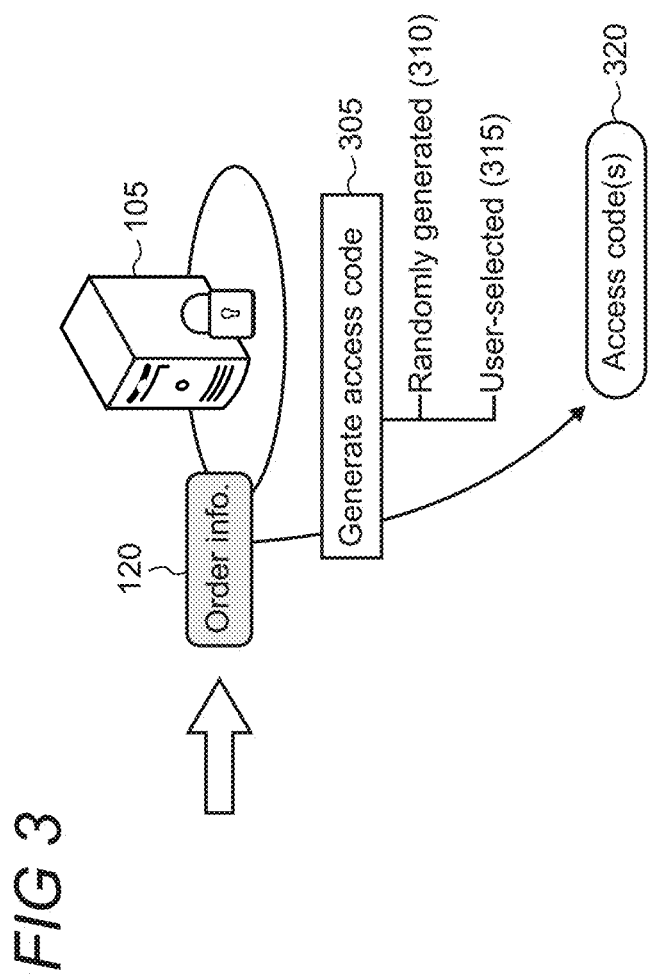
FIG. 3 shows and illustrative environment in which the lockbox remote service generates an access code.

FIG. 3 shows an illustrative environment in which the lockbox remote service 105 receives the order information 120 and subsequently generates an access code 320, as representatively shown by numeral 305. The access code 320 may be randomly generated 310 by the service or can be user-selected 315. The user may want to select his own access code for particular users and customize their usage, such as number of times or the duration of time that the access code can be used.

Even if the access code is randomly generated, the user may be able to customize the access code's usage, such as whether the access code is a one-time use, continuous use, or can be used for a given time period. For example, the user may select a particular day or days on which the access code can be used or a time range during the day so that the lockbox 135 is used when the user is not home. Any customizations of the access codes may be transmitted to the lockbox remote service, which in turn transmits the updated information to the deliverer 145 or other user seeking access to the lockbox.

Figure 4:
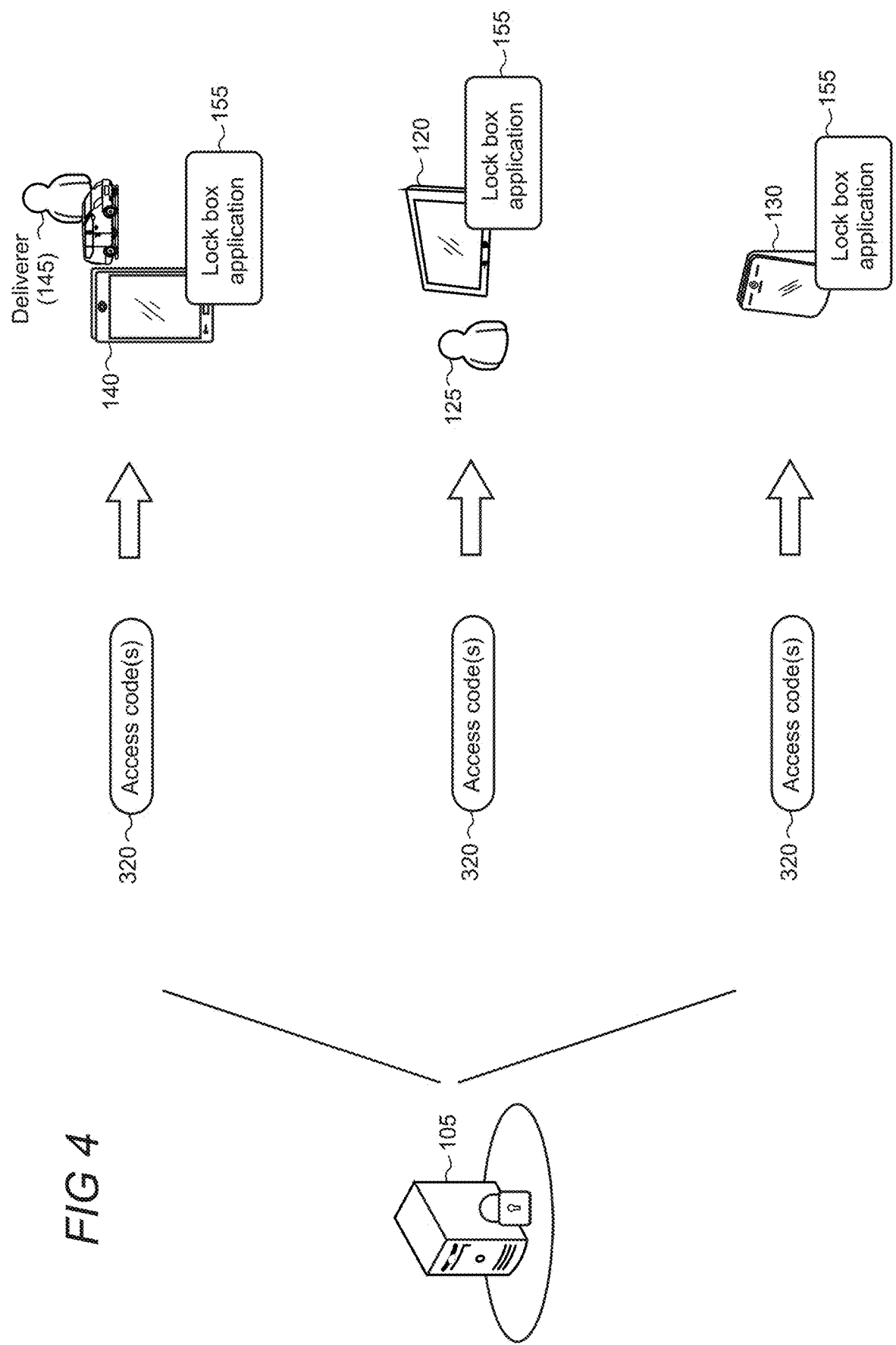
FIG. 4 shows an illustrative environment in which the lockbox remote service transmits the access code to various end devices.

FIG. 4 shows an illustrative environment in which the lockbox remote service 105 transmits the generated (or selected) access code 320 to various computing devices and users. For example, the user's and deliverer's respective lockbox applications 155 may receive the access code 320. In addition, the access device 130, which controls the locking and unlocking of the lockbox's compartments, receives access codes to know when to unlock a compartment. A lockbox application 155 may likewise be instantiated on the access device to communicate with the lockbox remote service, receive the access codes, and know how to process access code input from a user.

Figure 5:
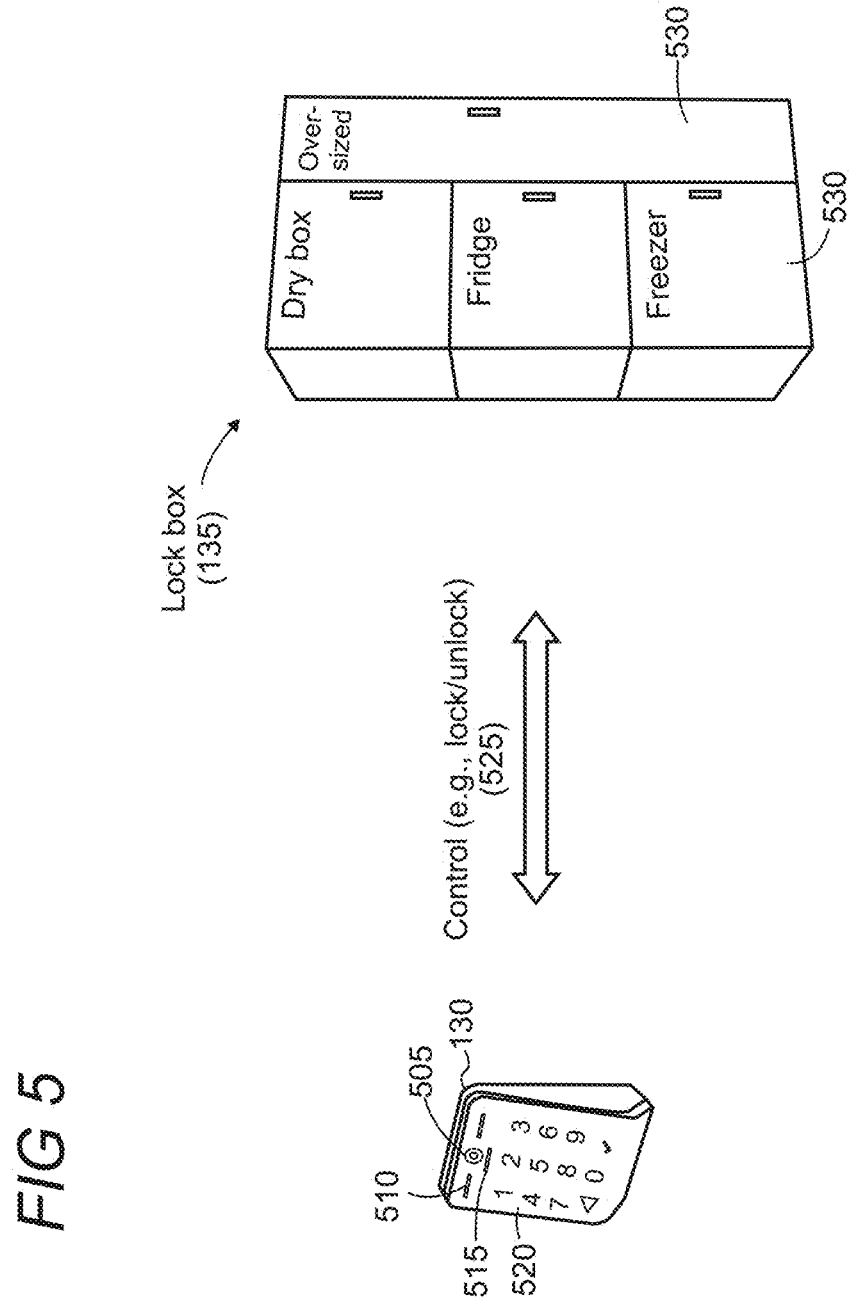
FIG. 5 shows an illustrative environment in which an access device controls the locking or unlocking of compartments on a lockbox.

FIG. 5 shows an illustrative representation in which the access device 130 controls (e.g., locks and unlocks) the various lockbox's compartments 530. The access device includes a touch screen display 520 to receive access code input from a user, a speaker to enable the user 125 to speak to the deliverer 145 during drop off, a microphone 515 to receive and record auditory sounds from the deliverer, and a camera 505 which records live video. While a touchscreen display is depicted herein for the input/output mechanism, other input devices are also possible, such as a biometric scan (e.g., iris or fingerprint scan), mechanical keypad, keyboard, NFC detection to the deliverer's computing device, etc.

The compartments may lock and unlock similar to an electronic door or safe lock, in which a latch or bolt extends from the door to the compartment frame to prevent access. The bolts may stay engaged until a correct access code is input which causes the bolt to revert from the compartment frame. An actuator may be utilized inside the compartment door which connects the bolt to a motor that extends and contracts the bolt. The actuator may be triggered by, for example, input of the correct access code at the access device. The actuator may be in communication with a processor, or controller, at the access device which verifies input of the correct access code and then triggers operation of the actuator and motor to revert the bolt from the compartment frame. Other forms and designs of lock implementations are also possible and the present disclosure is not limited to any particular lock design.

Upon detecting input at the touchscreen display 520, the access device 130 may activate various security features including switching on video and audio recording. The recorded content can be live streamed to the user's computing device 120 to enable the user 125 to monitor his lockbox 135 at relevant times. The live feed may be accessed via the lockbox application 155 or a web browser. Alternatively or additionally, the access device may be configured with a motion detector (not shown) that triggers the security features upon detecting movement.

As shown in FIG. 5, the lockbox 135 includes several different compartments 530 for various types of uses and deliveries. For example, a dry box compartment for the average package, fridge and freezer compartments for perishables, and an over-sized compartment for large items. The lockbox and its compartments may be insulated and weatherproof to protect the contents from harsh weather (e.g., rain, wind, snow, freezing temperatures). The lockbox may be comprised of steal or other metal and secured, or fastened, to a surrounding structure to prevent theft or otherwise manipulation of the lockbox. For example, the lockbox can be bolted to the ground and/or a wall.

Each compartment 530 may be associated with and opened by multiple different access codes 320 at any given time. For example, the lockbox remote service 105 and/or the authorized owner 125 of the lockbox 135 may generate different access codes for multiple respective users or deliverers 145. This enables the user/owner to have multiple different deliveries coming within a given time frame and further enables the user to know who accessed the lockbox in implementations in which the access codes are not shared among users. The lockbox remote service may keep logs of who accessed a compartment and when based on usage transmitted from the access device to the remote service. Assigning unique access codes to users enables user-identification each time a compartment is opened.

Figure 6:
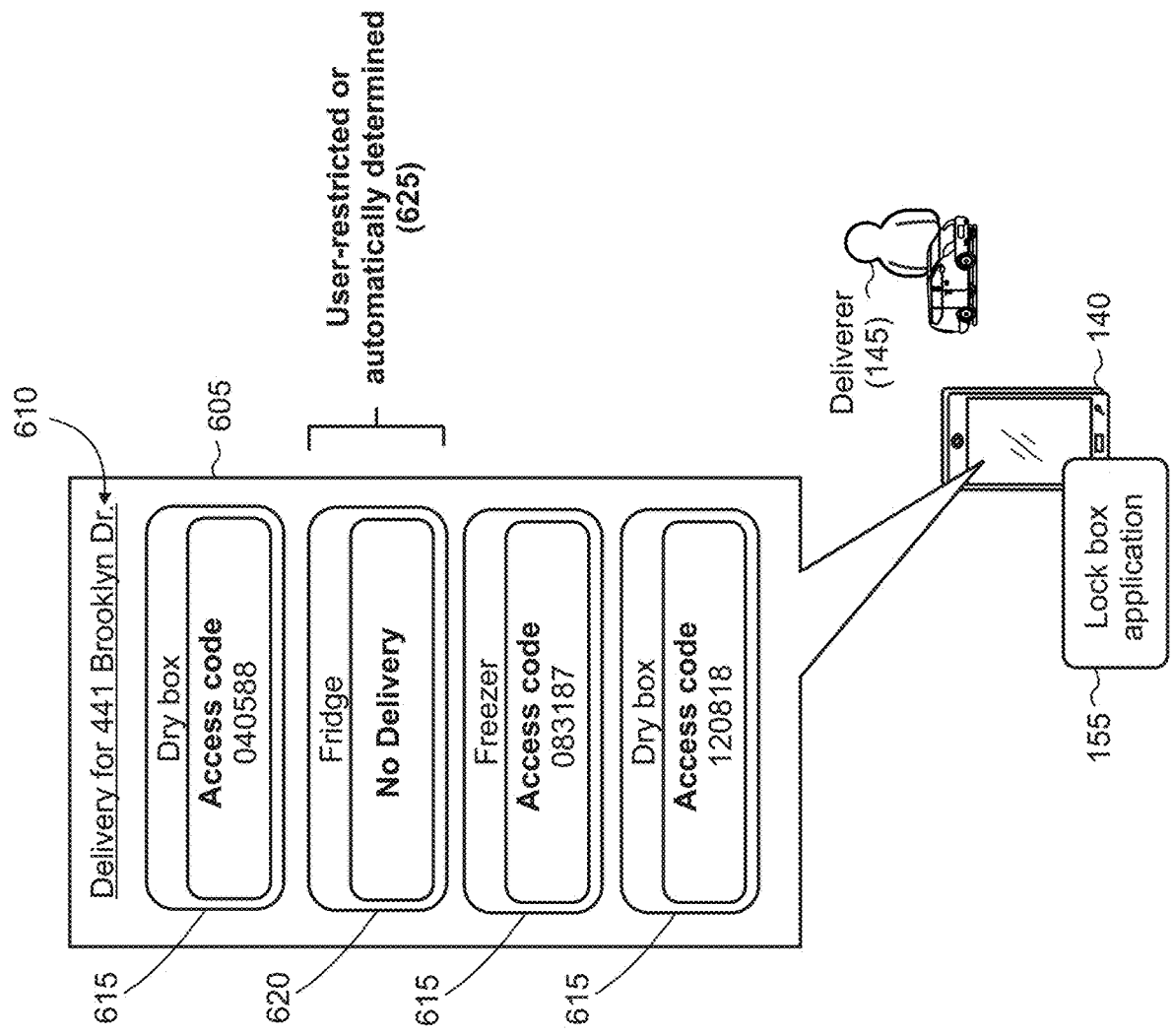
FIG. 6 shows an illustrative display of a deliverer's device in which access codes are rendered.

FIG. 6 shows an illustrative environment in which a deliverer's computing device 140, using the lockbox application 155, exposes the access codes 130 for the access device 130 and corresponding lockbox 135 on the display 605. The application exposes the user's physical address 610 so the deliverer knows for which access device to use the codes. In this implementation, the application exposes unique access codes 615 for each compartment 530 on the lockbox. Furthermore, the deliverer was not provided with an access code for the fridge since none of the packages for the placed order belong there.

The decision in withholding certain accessibilities may be automated by the lockbox remote service 105 based on the order information 120 provided by the e-commerce service 110, or may be determined and customized by the user 125, as representatively illustrated by numeral 630. In other implementations, a single access code may open one or more compartments. When a single access code is used to open the compartments, the user or lockbox remote service may still configure which compartments open upon entering the access code. For example, inputting the correct access code may cause one or more pre-selected compartments to open, such as the over-sized compartment only, the dry box and freezer compartment only, etc.

Figure 7A:
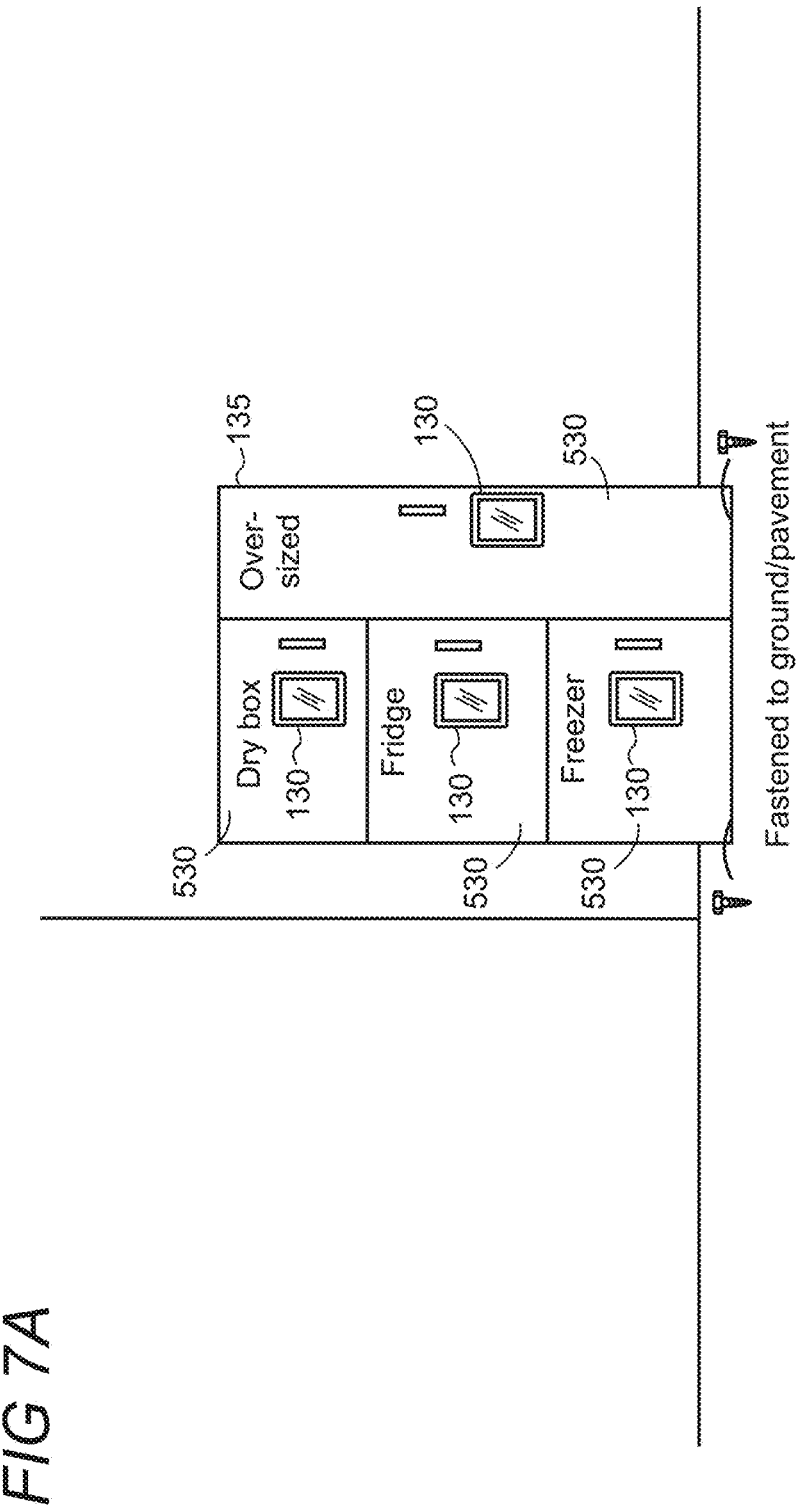
FIGS. 7A and B show illustrative environments in which access devices operate with the lockbox.

FIG. 7A shows an illustrative environment in which the lockbox 135 is configured with multiple access devices 130, each of which is connected to a respective compartment 530. Thus, in this implementation, each access device has control over its respective compartment and cannot control other compartments. The deliverer 145 may enter the access code 320 to the proper compartment in this setup. The access devices may communicate with the locks via a conductive wire, wireless communication, or a both. The lockbox is illustratively shown to be bolted to the ground to avoid theft or manipulation.

Figure 7B:
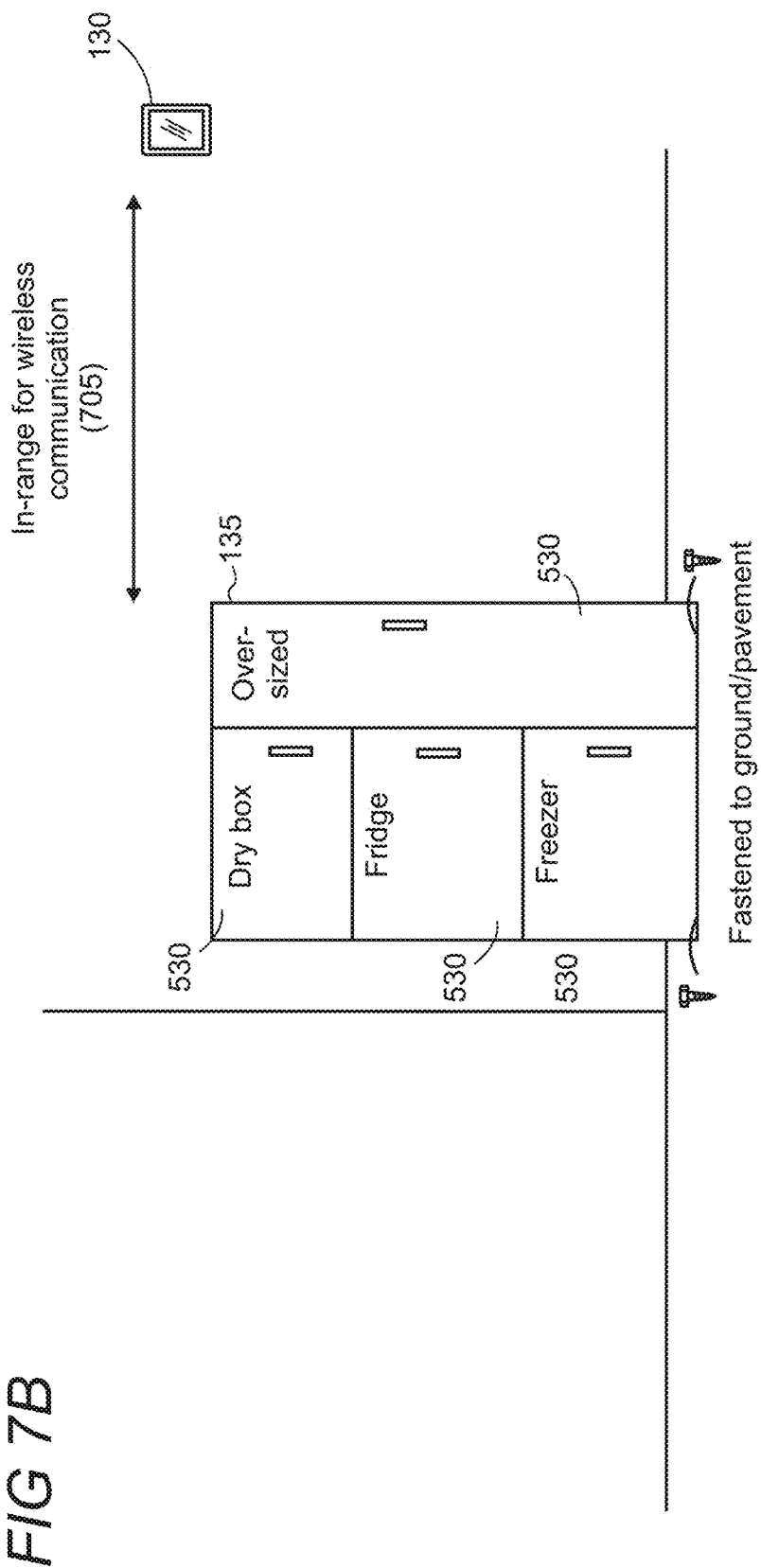

FIG. 7B shows an illustrative environment in which a single access device 130 can be utilized to control each compartment 530. For example, the access device can receive and process codes for and control access to the dry box, fridge, freezer, and oversized compartments. The access device and lockbox are each configured with wireless networkifng capabilities, such as a network interface card (NIC), to enable communicating over Bluetooth™, Wi-Fi, or NFC (near field communication) when in-range, as representatively illustrated by numeral 705.

FIG. 8 shows an illustrative environment in which the correct access code 320 is input into the access device 130, as representatively shown by numeral 805. The correct access code input causes the dry box compartment 530 to open so that the deliverer 145 can place the parcel 810 inside the opened compartment 815. As shown, other compartments are not opened since the deliverer entered the access code for the dry box compartment.

Figure 9:
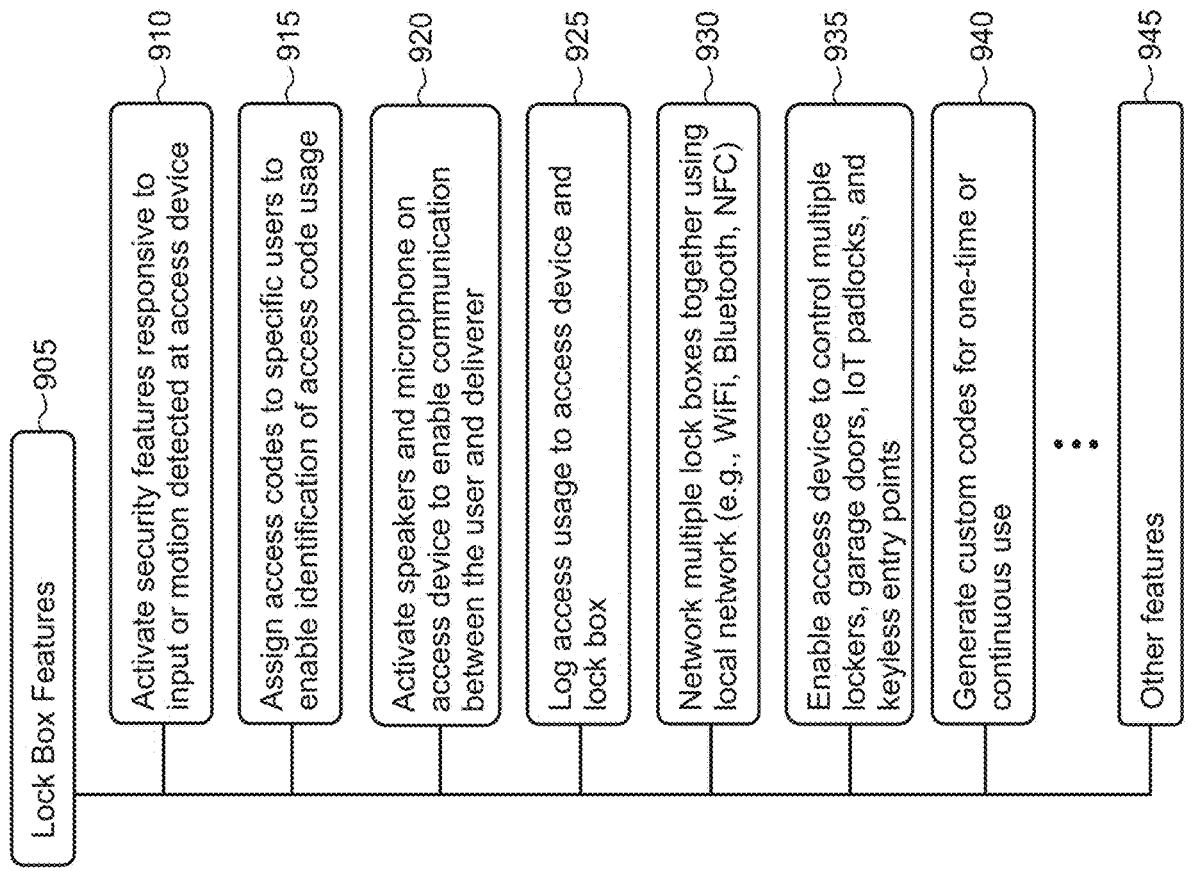
FIG. 9 shows an illustrative list of features provided by the lockbox system.

FIG. 9 shows an illustrative and non-exhaustive list of lockbox features 905 which may be implemented by the present lockbox and parcel management system. Exemplary lockbox features in the present system include activating security features responsive to input or motion detected at the access device 910; assign access codes to specific users to enable identification of access code usage 915; activate speakers and microphone on access device to enable communication between the user and deliverer 920; log access usage to access device and lockbox 925; network multiple lockboxes together using local network (e.g., Wi-Fi, Bluetooth, NFC) 930; enable access device to control multiple lockers, garage doors, IoT (Internet of Things) padlocks, and keyless entry points 935; generate custom codes for one-time or continuous use 940; and other features 945.

Figure 10:
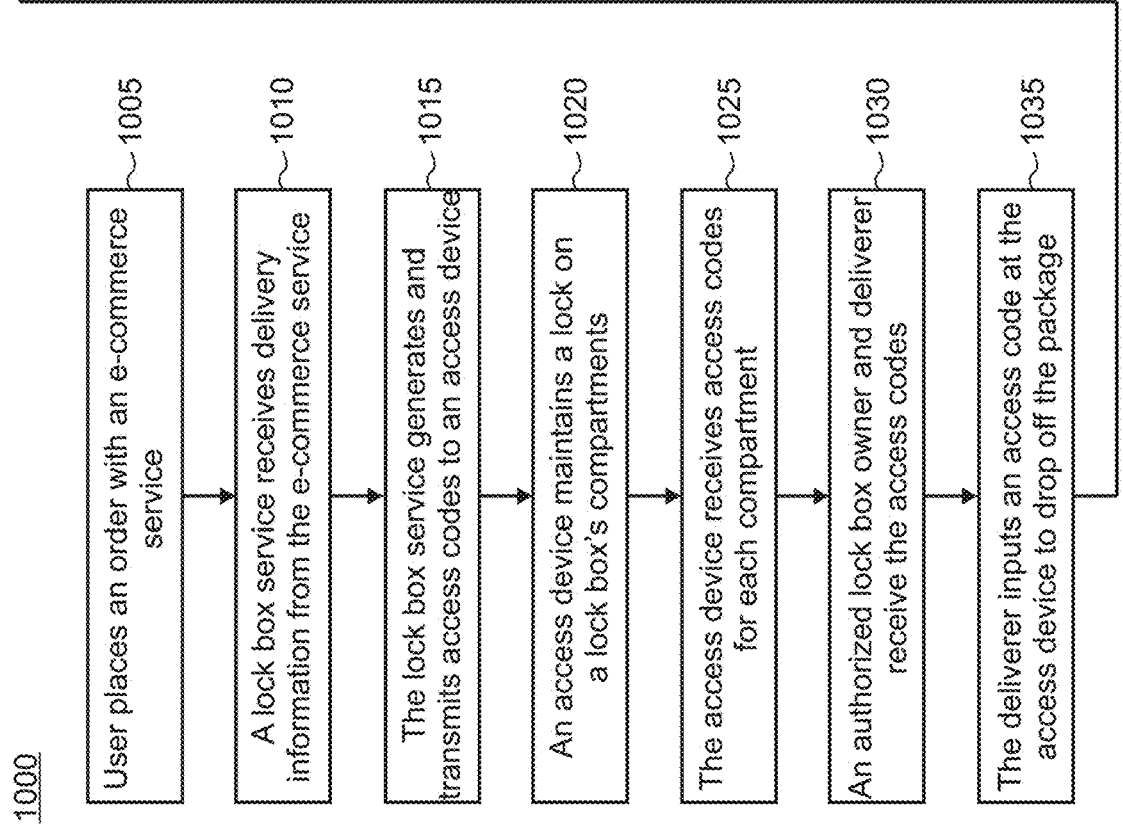
FIGS. 10 and 11 show exemplary flowcharts of the lotte lockbox and parcel management system.

FIG. 10 shows an illustrative process 1000 which the present lotte lockbox and parcel management system may implement. Although the steps are shown in sequential order, the features and actions therein may be alternatively arranged and/or certain steps may be added or removed. The process is exemplary only to show one specific implementation for understanding the present disclosure's features.

In step 1005, a user places an order with an e-commerce service. In step 1010, the lockbox service receives delivery information from the e-commerce service. In step 1015, the lockbox service generates and transmits access codes to an access device. In step 1020, an access device maintains a lock on a lockbox's compartments. In step 1025, the access device receives access codes for each compartment. In step 1030, an authorized lockbox owner (e.g., the user that placed the order) and deliverer receive the access codes. In step 1035, the deliverer inputs an access code at the access device to drop off the package containing the ordered items. In step 1040, the access code opens multiple entry points at the location. For example, responsive to receiving one or more access code inputs, the access device may unlock/open a garage door, behind which the lockbox is located, and open a compartment. Alternatively, a second access device may be located behind the garage door, in which case the deliverer can input an access code at the second access device to open a compartment.

In step 1045, the access device activates security features responsive to detecting input. In step 1050, the access device live streams video and audio recorded by the access device to the authorized owner/user. Additional access devices or recording devices may also be activated if available, such as for scenarios in which the lockbox is located behind a garage door. In this regard, the access code input at the first access device may trigger multiple different access device or other security device operations.

In step 1055, the compartment opens and receives the parcel from the deliverer. In step 1060, the access code for the deliverer expires. In step 1065, an authorized owner inputs an alternative access code to retrieve the delivered package. The authorized owner may have a set access code that he and other authorized users (e.g., family members, co-workers, etc.) can use to open the lockbox at any time. This access code may be changed periodically or at-will to maintain security over the lockbox. Alternatively, each authorized user/owner may have a designated access code to maintain security logs over who accessed the lockbox and when.

Figure 11:
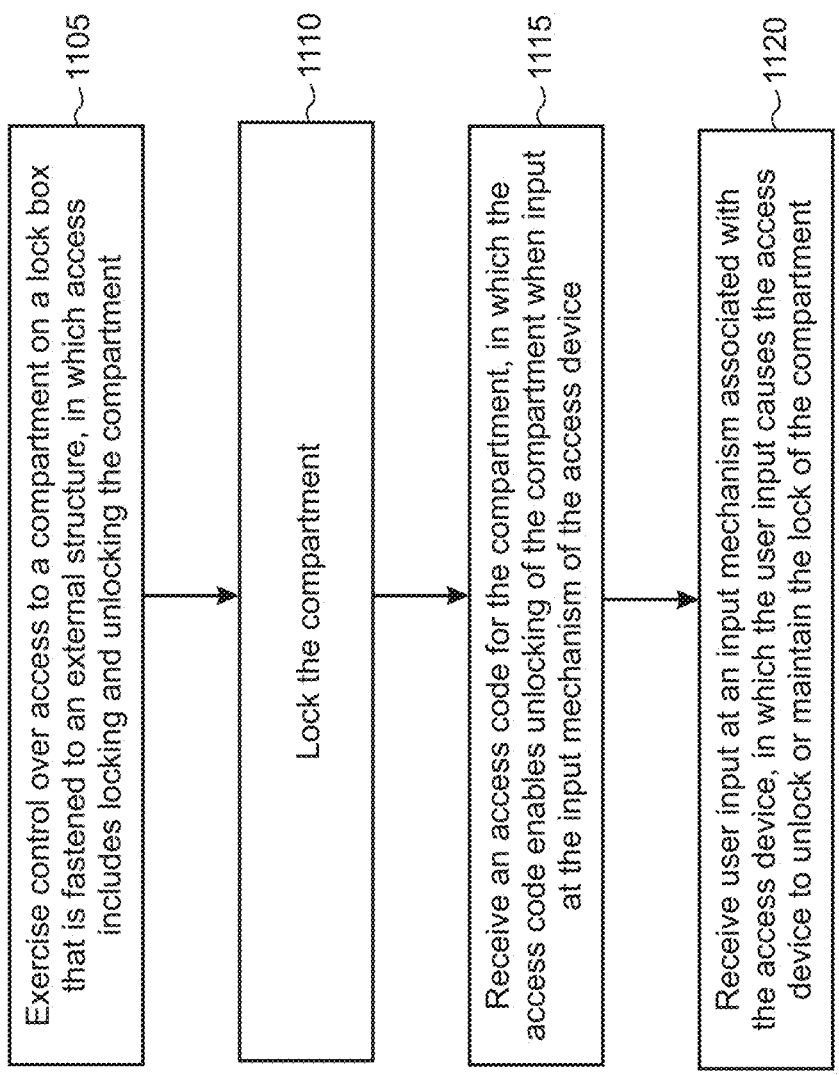

FIG. 11 shows an illustrative process 1100 by which the present lotte lockbox and parcel management system may operate using one or more computing devices and/or the access device. In step 1105, the access device exercises control over access to a compartment on a lockbox that is fastened to an external structure, in which controlling access includes locking and unlocking the compartment. In step 1110, the access device maintains a lock on the compartment. In step 1115, the access device receives an access code for the compartment, in which the access code enables unlocking of the compartment when input at the input mechanism of the access device. In step 1120, the access device receives user input at its input mechanism, in which the user input causes the access device to unlock or maintain the lock of the compartment.

Figure 12:
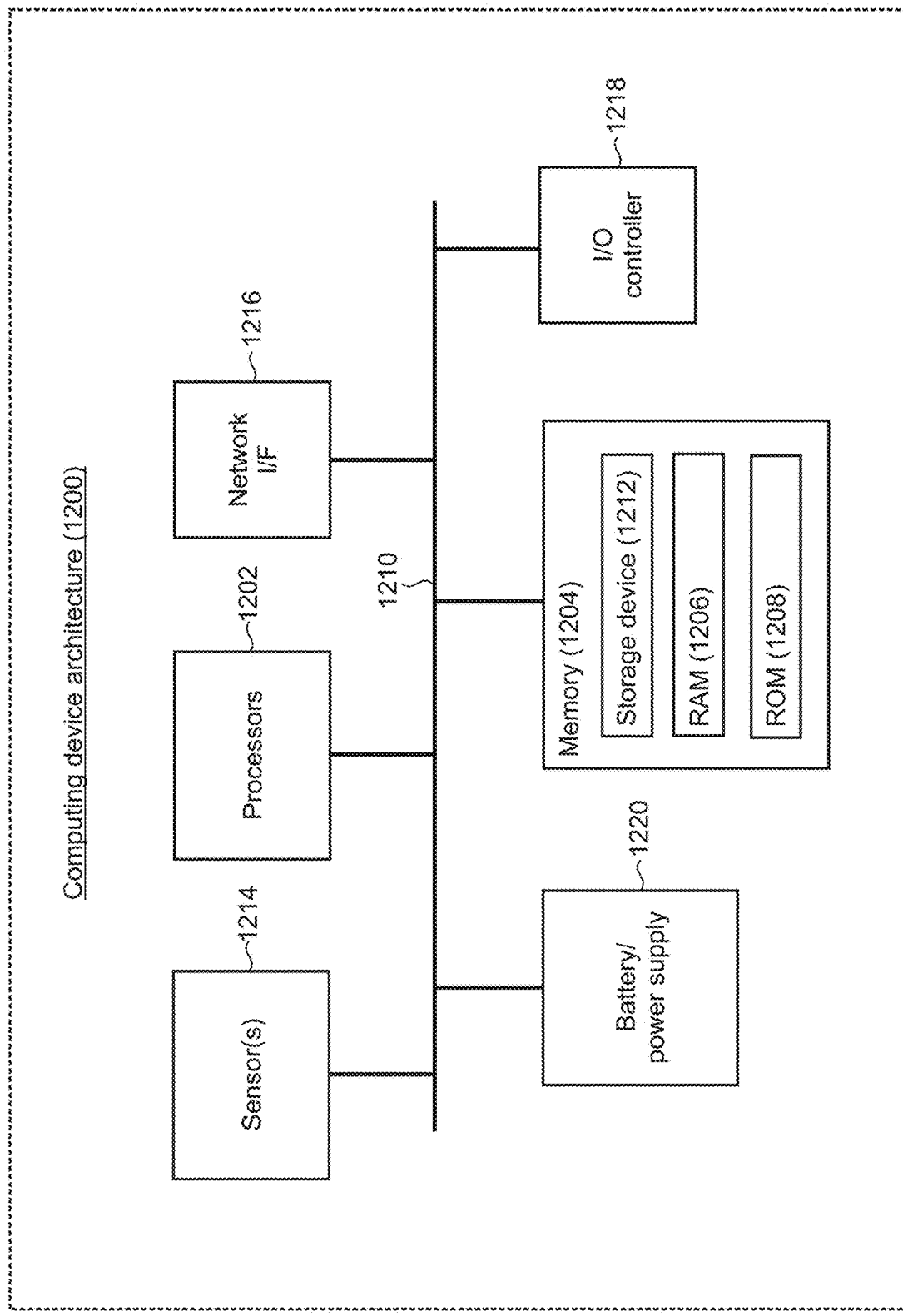
FIG. 12 shows a simplified block diagram of a computing device which may be used to implement the present lotte lockbox and parcel management system.

FIG. 12 shows an illustrative architecture 1200 for a device, such as a smartphone, tablet, laptop computer, or access device, capable of executing the various features described herein. The architecture 1200 illustrated in FIG. 12 includes one or more processors 1202 (e.g., central processing unit, dedicated AI chip, graphics processing unit, etc.), a system memory 1204, including RAM (random access memory) 1206, ROM (read only memory) 1208, and long-term storage devices 1212. The system bus 1210 operatively and functionally couples the components in the architecture 1200. A basic input/output system containing the basic routines that help to transfer information between elements within the architecture 1200, such as during startup, is typically stored in the ROM 1208. The architecture 1200 further includes a long-term storage device 1212 for storing software code or other computer-executed code that is utilized to implement applications, the file system, and the operating system. The storage device 1212 is connected to the processor 1202 through a storage controller (not shown) connected to the bus 1210. The storage device 1212 and its associated computer-readable storage media provide non-volatile storage for the architecture 1200. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1200, including solid stage drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1200.

According to various embodiments, the architecture 1200 may operate in a networked environment using logical connections to remote computers through a network. The architecture 1200 may connect to the network through a network interface unit 1216 connected to the bus 1210. It may be appreciated that the network interface unit 1216 also may be utilized to connect to other types of networks and remote computer systems. The architecture 1200 also may include an input/output controller 1218 for receiving and processing input from a number of other devices, including a keyboard, mouse, touchpad, touchscreen, control devices such as buttons and switches or electronic stylus (not shown in FIG. 12). Similarly, the input/output controller 1218 may provide output to a display screen, user interface, a printer, or other type of output device (also not shown in FIG. 12).

It may be appreciated that any software components described herein may, when loaded into the processor 1202 and executed, transform the processor 1202 and the overall architecture 1200 from a general-purpose computing system into a special-purpose computing system customized to facilitate the functionality presented herein. The processor 1202 may be constructed from any number of transistors or other discrete circuit elements, which may individually or collectively assume any number of states. More specifically, the processor 1202 may operate as a finite-state machine, in response to executable instructions contained within the software modules disclosed herein. These computer-executable instructions may transform the processor 1202 by specifying how the processor 1202 transitions between states, thereby transforming the transistors or other discrete hardware elements constituting the processor 1202.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1200 in order to store and execute the software components presented herein. It also may be appreciated that the architecture 1200 may include other types of computing devices, including wearable devices, handheld computers, embedded computer systems, smartphones, PDAs, and other types of computing devices known to those skilled in the art. It is also contemplated that the architecture 1200 may not include all of the components shown in FIG. 12, may include other components that are not explicitly shown in FIG. 12, or may utilize an architecture completely different from that shown in FIG. 12.

FIG. 13 is a simplified block diagram of an illustrative computer system 1300 such as a remote server, smartphone, tablet computer, laptop computer, or personal computer (PC) which the present disclosure may be implemented. Computer system 1300 includes a processor 1305, a system memory 1311, and a system bus 1314 that couples various system components including the system memory 1311 to the processor 1305. The system bus 1314 may be any of several types of bus structures including a memory bus or memory controller, a peripheral bus, or a local bus using any of a variety of bus architectures. The system memory 1311 includes read only memory (ROM) 1317 and random access memory (RAM) 1321. A basic input/output system (BIOS) 1325, containing the basic routines that help to transfer information between elements within the computer system 1300, such as during startup, is stored in ROM 1317. The computer system 1300 may further include a hard disk drive 1328 for reading from and writing to an internally disposed hard disk, a magnetic disk drive 1330 for reading from or writing to a removable magnetic disk (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300. Although this illustrative example includes a hard disk, a removable magnetic disk 1333, and a removable optical disk 1343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present disclosure. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk, optical disk 1343, ROM 1317, or RAM 1321, including an operating system 1355, one or more application programs 1357, other program modules 1360, and program data 1363. A user may enter commands and information into the computer system 1300 through input devices such as a keyboard 1366, pointing device (e.g., mouse) 1368, or touch-screen display 1373. Other input devices may include a microphone, joystick, game pad, satellite dish, scanner, trackball, touchpad, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 13 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computer system 1300, although only a single representative remote memory/storage device 1390 is shown in FIG. 13. The logical connections depicted in FIG. 13 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted that the network connections shown in FIG. 13 are illustrative and other means of establishing a communications link between the computers may be used depending on the specific requirements of an application of the present disclosure.

Various exemplary embodiments are now disclosed, including an access device configured to control access to one or more compartments on a lockbox, comprising: an input mechanism adapted to receive user input; one or more processors; and one or more hardware based memory devices comprising instructions which, when executed by the one or more processors, causes the access device to: exercise control over access to a compartment on the lockbox, in which access includes locking and unlocking the compartment, wherein the lockbox is fastened to an external structure including a base or wall to prevent movement of the lockbox; lock the compartment; receive an access code for the compartment, in which the access code enables unlocking of the compartment when input at the input mechanism of the access device; and receive user input at the input mechanism, wherein the access device: unlocks the compartment responsive to the received user input corresponding to the received access code; and maintains the lock of the compartment responsive to the received user input failing to correspond to the received access code.

As another example, access to other distinct compartments on the lockbox are respectively controlled by other access devices. In another example, the access device is connected to and controls access to multiple compartments on the lockbox. In another example, each compartment on the lockbox is associated with an individual access code that causes the access device to unlock a respective compartment based on the input access code. In another example, the compartments on the lockbox include a dry compartment, a refrigerated compartment, a freezer compartment, and an oversized compartment. In another example, the executed instructions further cause the access device to activate security features responsive to detecting input at the access device, in which the security features include recording audio and video and transmitting a live feed of the recorded audio and video to an authorized owner. As another example, the compartment is associated with multiple different access codes that cause the access device to unlock the compartment, in which each one of the multiple different access codes are assigned to specific users or user devices to identify who accessed the compartment. As another example, the access device is physically attached to the lockbox, and wherein the access device communicates with the compartment over Wi-Fi, Bluetooth™, or conductive wire. As another example, the access device is remote from the lockbox and communicates with the access device over short-range communication network including Wi-Fi, Bluetooth™, or Near Field Communication (NFC). In another example, the access code is randomly generated by a remote service which transmits the generated access code to a deliverer's device to enable the deliverer to drop off a package to the lockbox's compartment, and wherein an authorized owner of the lockbox likewise receives the generated code. In another example, the lockbox includes multiple compartments, and wherein the remote service generates and transmits different access codes for each respective compartment. As another example, the access code is a one-time use code that expires after use. In another example, an authorized owner of the lockbox generates the access code using a local application instantiated on the user's computing device, in which the user's computing device transmits the generated access code to the access device and a deliverer's device. In another example, the access device controls additional keyless access points throughout an authorized owner's establishment, including garage doors and IoT (Internet of Things) padlocks. In another example, the access code unlocks at least one keyless entry point and the compartment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system implemented on one or more computing devices, comprising:
   one or more processors;
   one or more hardware-based memory devices having computer-executable instructions which, when executed by the one or more processors, causes the one or more computing devices to:
   associate an access code for an entry point, in which the access code enables unlocking of the entry point when input at an access computing device associated with the entry point,
   wherein the access code is active and usable according to a set time period or limit that causes the access device to unlock the entry point, in which the access code is assigned to one or more specific users or user devices.

2. The system of claim 1, wherein the access code is associated responsive to a user placing an order with an e-commerce service.

3. The system of claim 1, wherein the entry point is associated with multiple access codes.

4. The system of claim 1, wherein the associated access code is transmitted to the access computing device so as to authenticate user-access upon receiving the access code as input.

5. The system of claim 1, wherein the access code is randomly generated.

6. The system of claim 1, wherein the access code is selected by a user.

7. The system of claim 1, wherein the entry point is a compartment associated with a lockbox.

8. The system of claim 1, wherein the entry point is a door.

9. The system of claim 1, further comprising generating multiple access codes, in which each access code is specifically associated to an entry point.

10. A method performed by one or more computing devices, comprising:
    associating an access code for an entry point, in which the access code enables unlocking of the entry point when input at an access computing device associated with the entry point,
    wherein the access code is active and usable according to a set time period or limit that causes the access device to unlock the entry point, in which the access code is assigned to one or more specific users or user devices.

11. The method of claim 10, wherein the entry point is associated with multiple access codes.

12. The method of claim 10, wherein the associated access code is transmitted to the access computing device so as to authenticate user-access upon receiving the access code as input.

13. The method of claim 10, wherein the access code is randomly generated.

14. The method of claim 10, wherein the access code is selected by a user.

15. The method of claim 10, wherein the entry point is a compartment associated with a lockbox.

16. The method of claim 10, wherein the entry point is a door.

17. The method of claim 10, further comprising generating multiple access codes, in which each access code is specifically associated to an entry point.

18. One or more hardware-based non-transitory memory devices having computer-executable instructions which, when executed by one or more processors disposed in a computing device, cause the computing device to:
    associate an access code for an entry point, in which the access code enables unlocking of the entry point when input at an access computing device associated with the entry point, wherein the access code is active and usable according to a set time period or limit that causes the access device to unlock the entry point, in which the access code is assigned to one or more specific users or user devices.

19. The one or more hardware-based non-transitory memory devices of claim 18, wherein the access code is associated responsive to a user placing an order at an e-commerce service.

20. The one or more hardware-based non-transitory memory devices of claim 18, wherein the entry point is associated with multiple access codes.

* * * * *